United States Patent
Ramprashad et al.

(10) Patent No.: US 9,503,815 B2
(45) Date of Patent: Nov. 22, 2016

(54) PERCEPTUAL ECHO GATE APPROACH AND DESIGN FOR IMPROVED ECHO CONTROL TO SUPPORT HIGHER AUDIO AND CONVERSATIONAL QUALITY

(71) Applicant: Apple Inc., Cupertino, CA (US)

(72) Inventors: Sean Anthony Ramprashad, Los Altos, CA (US); Qing Yang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 112 days.

(21) Appl. No.: 14/289,437

(22) Filed: May 28, 2014

(65) Prior Publication Data

US 2015/0350778 A1    Dec. 3, 2015

(51) Int. Cl.
*H04R 3/00* (2006.01)
*H04R 3/02* (2006.01)
*H04M 9/08* (2006.01)
*H04M 19/08* (2006.01)

(52) U.S. Cl.
CPC .............. *H04R 3/02* (2013.01); *H04M 9/08* (2013.01); *H04M 19/08* (2013.01)

(58) Field of Classification Search
CPC .......... H04R 3/00; H04R 3/02; H04R 3/002; H04R 2410/01; H04R 2410/03; H04R 2227/001; H04R 2227/005; H04R 2227/007; H04R 29/007; H04R 2420/07; H04M 9/082; H04M 9/02; H04M 9/08; H04M 3/002; G10K 2210/505; G10K 11/178; G10K 11/1784; H04B 3/20; H04B 3/23; H04B 7/015
USPC ................................ 381/71.1, 73.1, 94.1, 66
See application file for complete search history.

(56) References Cited

U.S. PATENT DOCUMENTS

| | | |
|---|---|---|
| 6,622,030 B1 | 9/2003 | Romesburg et al. |
| 7,711,107 B1 | 5/2010 | Murgia et al. |
| 8,275,139 B2 | 9/2012 | Kumar et al. |
| 8,472,616 B1 | 6/2013 | Jiang |
| 8,600,037 B2 | 12/2013 | Krishnaswany |
| 2014/0126745 A1 | 5/2014 | Dickins et al. |

OTHER PUBLICATIONS

Enzner, et al. "Unbiased Residual Echo Power Estimation for Hands-Free Telephony." *IEEE International Conference on Acoustics, Speech, and Signal Processing (ICASSP).* IEEE (2002). pp. II-1893-1896. 4 pages.
Gustafsson, et al., "A Psychoacoustic Approach to Combined Acoustic Echo Cancellation and Noise Reduction." *IEEE Transactions on Speech and Audio Processing*, vol. 10, No. 5 (Jul. 2002). pp. 245-256. 12 pages.

(Continued)

*Primary Examiner* — Ahmad F Matar
*Assistant Examiner* — Sabrina Diaz
(74) *Attorney, Agent, or Firm* — Blakely, Sokoloff, Taylor & Zafman LLP

(57) ABSTRACT

To address issues with present echo gate control, a method and apparatus for more intelligently operating an echo gate is described herein. In particular, the decision of whether to mute an uplink signal, or not, is formulated herein as primarily a perceptual decision based on an appropriate analysis of the perceptual interaction of the current residual echo and the current near-end signal(s). By doing so, the application of muting through an echo gate may be minimized and/or more appropriately engaged. This will lead to fewer dropouts and muting of speech onsets and offsets 1) during periods such as double-talk or 2) during periods of downlink playback in the presence of low near-end signal levels, two cases of particular importance.

25 Claims, 3 Drawing Sheets

(56) References Cited

OTHER PUBLICATIONS

Hoshuyama, et al. "An Acoustic Echo Suppressor Based on a Frequency-Domain Model of Highly Nonlinear Residual Echo." *IEEE International Conference on Acoustics, Speech and Signal Processing, ICASSP 2006 proceedings*. IEEE (2006). pp. v-269-272. 4 pages.

Johnston, James D. "Transform Coding of Audio Signals Using Perceptual Noise Criteria." *IEEE Journal on Selected Areas in Communications*, vol. 6, No. 2 (Feb. 1988). pp. 314-323. 10 pages.

Schroeder, et al. "Optimizing Digital Speech Coders by Exploiting Masking Properties of the Human Ear." *J. Acoustic Society of America*, 66(6) (Dec. 1979). pp. 1647-1652. 6 pages.

PERCEPTUAL ECHO GATE APPROACH AND DESIGN FOR IMPROVED ECHO CONTROL TO SUPPORT HIGHER AUDIO AND CONVERSATIONAL QUALITY

FIELD

A system and method for control of an echo gate, which mutes a primary uplink signal, based on a perceptual analysis is described. Other embodiments are also described.

BACKGROUND

Communication systems involve a near-end system and a far-end system, which communicate over a medium. For example, a near-end system may detect sound produced by one or more sound sources at the near-end location and transmit this detected sound as an uplink signal to a far-end system at another location.

Ideally, the near-end system only detects the sound from an intended sound source (e.g., a near-end user). However, in many scenarios, in particular two-way communication systems, the detected sound at the near-end may include, in addition to sound from the intended sound source, the far-end sound, which is received from a downlink signal and played-back by the near-end system through a speaker (i.e., acoustic echo). To maintain an effective communication system, this acoustic echo needs to be controlled such that the users of such a communication system may clearly understand their distant counterpart.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

A method and apparatus for more intelligently operating an echo gate is described herein. In particular, the decision of whether to mute the uplink signal, or not, is formulated herein as primarily a perceptual decision based on an appropriate analysis of the perceptual interaction of the current residual echo and the current near-end signal(s). By doing so, the application of muting through an echo gate may be minimized and/or more appropriately engaged. This will lead to fewer dropouts 1) during periods such as double-talk where both near-end and echo are active or 2) during periods of downlink playback in the presence of low near-end signal levels such as background noise, two cases of particular importance.

For example in one embodiment, a perceptual interaction, on which a perceptual echo gate may be controlled, may be modeled through a masking threshold. This masking threshold may further be used to estimate a supra-threshold loudness metric. The supra-threshold loudness metric may thereafter be used (or a normalized version of the supra-threshold loudness metric) to control the toggling of the perceptual echo gate between un-mute, partial mute, and full mute, with appropriate hysteresis and thresholds similar to those used in a non-perceptual echo gate.

Testing has shown that this new relative-loudness measure can easily be ten or more decibels different than a simple relative-energy measure, which is used by traditional echo gates. Accordingly, the perceptual echo gate described herein may behave very differently in the intermediate cases where the level of near-end and echo is such that perceptual analysis is needed. These cases have been shown to be critical to voice quality, (e.g., they can include cases of devices used in cars, on the street, etc.), where the very random nature of the background noise, as a near-end source, can mask residual echo.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments are described with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
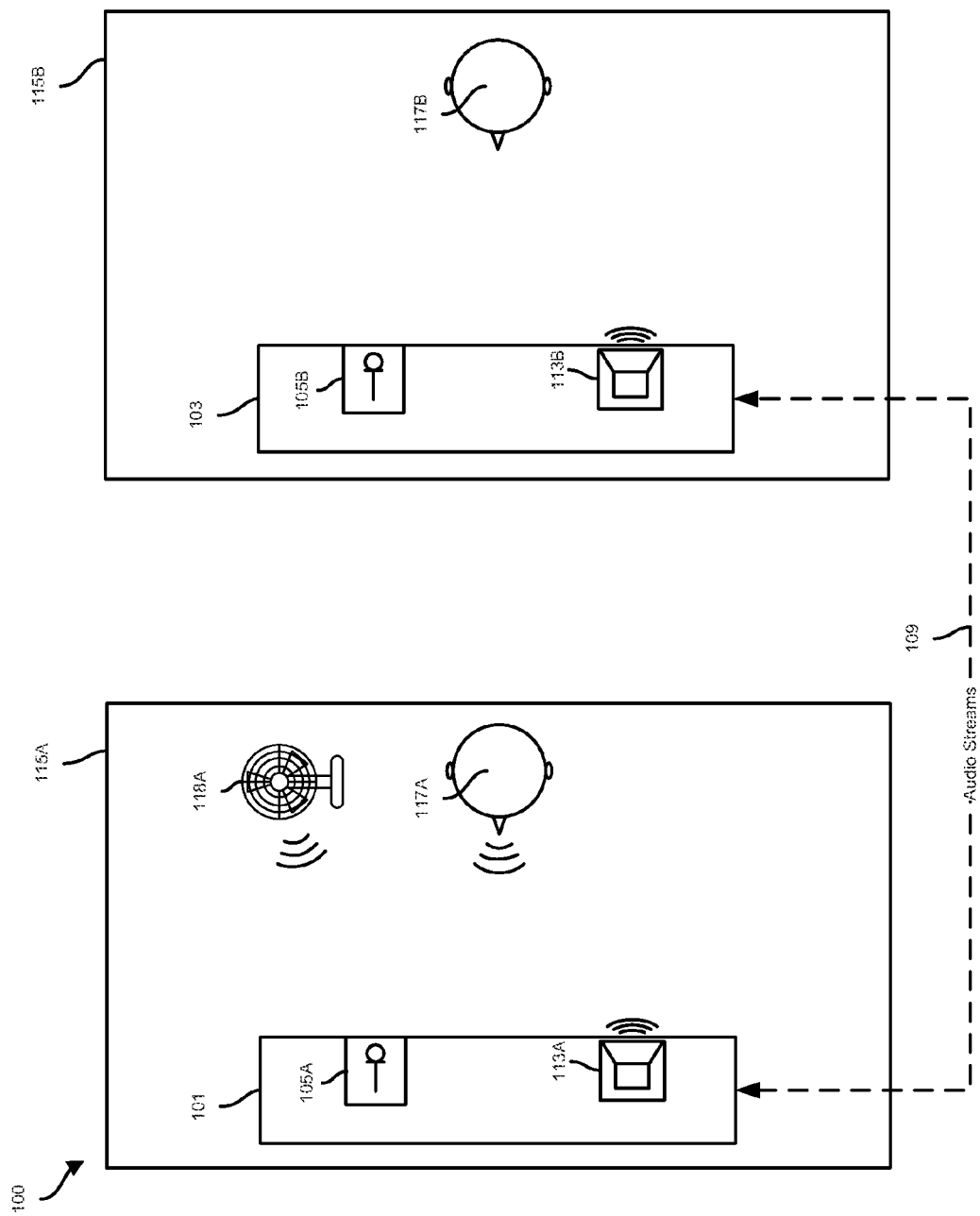
FIG. 1 shows a conference system that transfers audio signals/streams between a near-end computing system and a far-end computing system according to one embodiment.

FIG. 1 shows a conference system 100 that transfers audio signals/streams between a near-end computing system 101 and a far-end computing system 103. The audio streams may be captured by each of the near-end and far-end computing systems 101 and 103 using associated microphones 105A and 105B. The conference system 100 may synchronously or asynchronously transfer audio signals/streams between the near-end and far-end systems 101 and 103 over the data connection 109 such that each of these signals/streams may be played through corresponding loudspeakers 113A/113B. Each element of the conference system 100 will be described by way of example below. In some embodiments, the conference system 100 may include more elements than those shown and described.

As shown in FIG. 1, the near-end system 101 may be located at a near-end location 115A and the far-end system 103 may be located at a far-end location 115B. For example, the near-end location 115A may be a business conference room being utilized by the near-end user 117A and the far-end location 115B may be a business conference room being utilized by the far-end user 117B. However, in some embodiments, the near-end location 115A and/or the far-end location 115B may be outdoor areas. The near-end and far-end locations 115A and 115B may be separated by any distance (e.g., 500 feet or 500 miles) and the near-end system 101 and the far-end system 103 may communicate with each other using the data connection 109.

The data connection 109 may be any combination of wired and wireless mediums operating in a distributed or a point-to-point network. For example, the data connection 109 may utilize a combination of wired and wireless protocols and standards, including the IEEE 802.11 suite of standards, IEEE 802.3, cellular Global System for Mobile Communications (GSM) standards, cellular Code Division Multiple Access (CDMA) standards, Long Term Evolution (LTE) standards, and/or Bluetooth standards.

Figure 2:
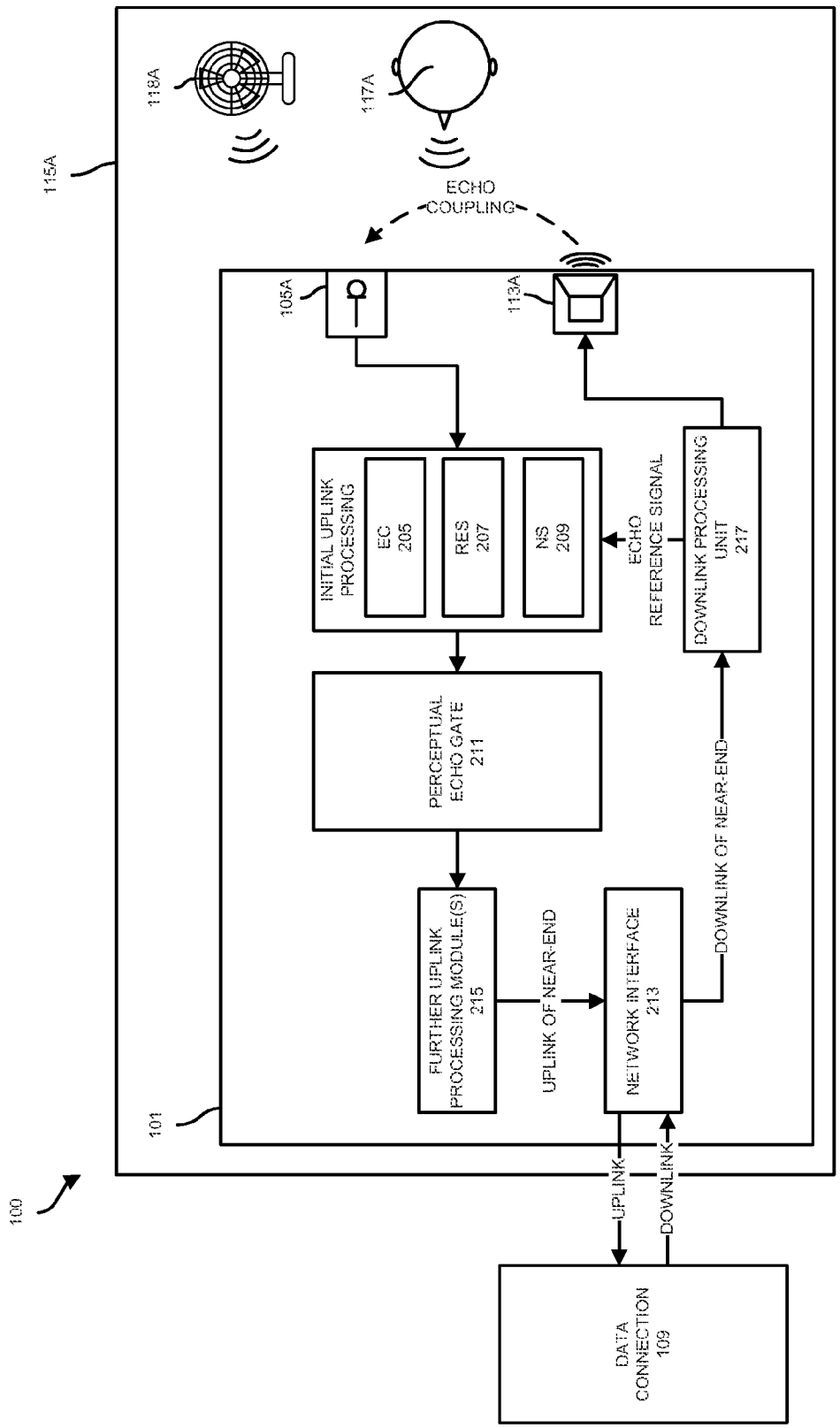
FIG. 2 shows a component diagram of the near-end system according to one embodiment.

FIG. 2 shows a component diagram of the near-end system 101 according to one embodiment. In one embodiment, the near-end system 101 may be any computing system that is capable of performing conferencing operations to transmit and receive captured audio signals/streams to/from the far-end system 103 over the data connection 109. For example, the near-end system 101 may be a laptop computer, a desktop computer, a tablet computer, a conference phone, and/or a mobile device (e.g., cellular telephone or mobile media player). A video system may also be active in parallel with the audio system. Each element of the near-end system 101 shown in FIG. 2 will be described below by way of example. In one embodiment, the elements of the far-end system 103 may be similar or identical to the elements of the near-end system 101. Accordingly, although only the near-end system 101 is being shown and described below, it is understood that the far-end system 103 may be similarly configured.

As noted above, in one embodiment, the near-end system 101 may include a microphone 105A. The microphone 105A may sense sounds and convert these sensed sounds into electrical signals. The microphone 105A may be any type of acoustic-to-electric transducer or sensor, including a Micro-Electrical-Mechanical System (MEMS) microphone, a piezoelectric microphone, an electret condenser microphone, or a dynamic microphone. Although described in relation to a single microphone 105A, in some embodiments, the near-end system 101 may include multiple microphones 105A that operate independently or jointly as an array.

As noted above, the near-end system 101 may include a loudspeaker 113A for outputting audio received from the far-end system 103. As shown, the loudspeaker 113A may receive audio signals from the far-end system 103. In one embodiment, the loudspeaker 113A may include a single transducer for producing sound. While in other embodiments, the loudspeaker 113A may include multiple transducers for producing sound and operates as a loudspeaker array.

The one or more transducers within the loudspeaker 113A may be any combination of full-range drivers, mid-range drivers, subwoofers, woofers, and tweeters. Each of the transducers may use a lightweight diaphragm, or cone, connected to a rigid basket, or frame, via a flexible suspension that constrains a coil of wire (e.g., a voice coil) to move axially through a cylindrical magnetic gap. When an electrical audio signal is applied to the voice coil, a magnetic field is created by the electric current in the voice coil, making it a variable electromagnet. The coil and the transducers' magnetic system interact, generating a mechanical force that causes the coil (and thus, the attached cone) to move back and forth, thereby reproducing sound under the control of the applied electrical audio signal coming from a source (e.g., the far-end system 103).

Although shown as including one loudspeaker 113A, the near-end system 101 may include any number of loudspeakers 113A. Hereinafter, the near-end system 101 will be described as including a single loudspeaker 113A; however, as described above, it is understood that the near-end system 101 may operate in a similar fashion with multiple loudspeakers 113A.

In one embodiment, the near-end system 101 may include a network interface 213 for transmitting and receiving signals to/from the far-end system 103. For example, the network interface 213 may transmit audio signals over the data connection 109 via the network interface 213. The network interface 213 may operate using any combination of wired and wireless protocols and standards, including the IEEE 802.11 suite of standards, IEEE 802.3, cellular Global System for Mobile Communications (GSM) standards, cellular Code Division Multiple Access (CDMA) standards, Long Term Evolution (LTE) standards, and/or Bluetooth standards.

For the conference system 100 to work effectively in human-to-human communication (e.g., a conversation between the near-end user 117A and the far-end user 117B), the acoustic echo inherent in the system 100 needs to be controlled. This echo is due to coupling between the loudspeaker 113A and the microphone 105A as shown in FIG. 2. The perception of this echo, which is perceived at the far-end location 115B as an echo of their own acoustic sources (e.g., the far-end user 117B), becomes more noticeable as the (joint) delay in downlink transmission, downlink processing, uplink processing, and uplink transmission, increases. The perception of echo as an impairment also increases as playback levels of the loudspeaker 113A increase and the coupling between the loudspeaker 113A and the microphone 105A increases. These issues tend to occur with more recent devices, modern communication applications, and networks such as IP-based networks.

Various elements in the uplink processing chain may help to reduce this echo. In particular, one or more linear echo cancelers (ECs) 205 may be used to reduce the amount of echo in a microphone signal generated by the microphone 105A. An EC 205 may control echo by modeling the echo coupling between the microphone 105A and the loudspeaker 113A. An echo reference signal from the downlink helps in this modeling. The EC 205 then estimates the echo and removes this estimated echo from the incoming microphone signal. Typically the raw echo level in a signal generated by the microphone 105A may be reduced by 20 to 40 dB by the EC 205 depending on the design of the EC 205, configuration of the near-end system 101, properties of the loudspeaker 113A and the microphone 105A, and the scenario in which sound is detected by the microphone 105A.

Unfortunately, even with cancellation at the higher-end of 40 dB, depending on the near-end signal (e.g., local voice or local noise in the near-end location 115A) this post-EC 205 reduced echo may still be perceptible in the post-EC 205 processed microphone signal. For example, if there is little or no near-end sound (e.g., background noise from a source such as the fan 118A and/or sound from the near-end user 117A), the reduced echo may be more easily noticed.

A residual echo suppressor (RES) 207 may also be used to further suppress components of this post-EC 205 echo, which are not effectively removed or sufficiently reduced by the EC 205. Often this type of processing is not linear, but is done by scaling different frequency bands in a time varying fashion. In a similar fashion, one or more noise suppressors (NSs) 209 may also target suppression of other undesired portions of the microphone signal. In particular, the NSs 209 may suppress unwanted near-end noise (e.g., background noise generated by a fan). Though not targeting residual echo as does the RES 207, the NS 209 may also affect the residual echo, which remains after uplink processing by EC 205 and the RES 207.

Both the RES 207 and NS 209 have to be controlled (limited), however, since these units may affect both the post-EC 205 echo as well as desired near-end signals (e.g., signals representing sound from the near-end user 117A). In particular, while echo may be reduced by the RES 207, the desired near-end signals may also be distorted as a result of such suppression.

In one embodiment, each of the EC 205, RES 207, and NS 209 may be implemented by one or more of software and/or hardware components. For example, the operations of the EC 205, RES 207, and NS 209 may be performed by one or more software programs stored on a memory unit of the near-end system 101 and run by a hardware processor. In another embodiment, specialized hardware circuitry may be utilized to perform one or more operations of the EC 205, RES 207, and NS 209.

Even after the joint processing by the EC 205, RES 207, NS 209, and other uplink processing components, the remaining residual echo (i.e., the residual echo is the echo still present after processing by the EC 205, the RES 207, and the NS 209) seen on the primary signal (i.e., the signal used for uplink to the far-end system 103) may still be objectionable. This may be true, for example, if the overall level of the near-end signal is very low. In such a case, even very low levels of residual echo may be perceived by the far-end user 117B. This is one example of what is inherently a perceptual interaction, whereby a low level of residual echo can be perceived since there is no other sound to render such a quiet sound less perceptible or imperceptible. In such a case, or any case where residual echoes may be deemed unacceptable, an echo gate may be used to simply mute the primary uplink signal from the near-end system 101, preventing residual echoes from propagating any further into uplink processing or to the far-end system 103.

In some early phone systems, network echoes, which are perceived acoustically, were present given the hybrid created by impedance mismatches in the 4-to-2 wire design of the transmission system. However, in early systems the delay in the transmission network was quite short compared to present day systems. Therefore, it was somewhat acceptable that when there was an uplink transmission, and thus network echoes, one or more of the transmissions may be cut. This gating may lead to drop outs during periods of "double-talk" (i.e., double talk occurring when the users 117A and 117B talk simultaneously). This leads to a system that is more half-duplex than full-duplex. Again, however, with low enough delay this half-duplex nature may not have an extreme effect on conversation quality.

As delay in transmission increases, these dropouts due to echo gating, both at the network level as well as the acoustic uplink processing level, become more noticeable by parties in a call. Thus, in public-switched telephone networks (PSTN) there are network echo cancelers that help to try to control network echo to preserve a full duplex connection at the network level, and acoustic echo cancelers (i.e., the EC 205), which try to control acoustic echo to preserve a full duplex connection. However, as mentioned above, despite the use of the EC 205 and/or the RES 207, and other uplink modules, there may be an instance in a conversation where the system has no better choice than to mute (or gate) the uplink transmission from one or more end-points.

To address issues with present echo gate control, a method and apparatus for more intelligently operating an echo gate is described herein. In particular, the decision of whether to mute the uplink signal, or not, is formulated herein as primarily a perceptual decision based on an appropriate analysis of the perceptual interaction of the current residual echo and the current near-end signal(s). By doing so, the application of muting through an echo gate may be minimized and/or more appropriately engaged. This will lead to fewer dropouts 1) during periods such as double-talk or 2) during periods of downlink playback in the presence of low near-end signal levels, two cases of particular importance.

In some embodiments, echo gates may operate based on crude measures such as relatively simple comparisons of the relative root mean square (RMS) or energy levels of both the near-end signals and the undesired residual echo. Energy-based levels may focus on one or a few sub-bands of importance. However, by their very nature, energy levels have some critical deficiencies.

In particular, such RMS measures may not entirely capture the full nature of the perceptual interactions of the two signals (i.e., between desired near-end signals and undesired residual echoes). The result is that these echo gates, based on energy measures, tend to operate either with high levels of missed detections of objectionable echoes or high levels of false alarms of perceptible echoes. In the former case, residual echoes may be passed through the echo gate more than they should. While in the latter case, the echo gate may mute the uplink more than it should. Generally, there is a tradeoff in balancing these detrimental effects, with one increasing as the other decreases, similar to classic receiver operator characteristic (ROC) tradeoffs in detection problems.

Driven by RMS levels, an echo gate passes the uplink signal through when the energy level W of near-end sound exceeds the energy level R of residual echo by a given threshold number of decibels and mutes the uplink when W-R drops below a given threshold. Between open and closed thresholds, hysteresis may be introduced to smooth measures or adapt offsets and thresholds in order to control the on/off gate behavior so the gate state does not toggle between on/off states too rapidly, which itself may lead to other detrimental effects.

Perceptual Thresholds

To address the deficiencies with echo gates that utilize energy levels or other similar measures for control, the echo gate 211 may utilize perceptual principles. One such perceptual interaction may be modeled through a masking threshold. In particular, if the desired signal at a level of X dB is narrowband noise (where "narrow" is small in relationship to a critical bandwidth of the human auditory system around the frequencies active in the noise), and the undesired sound signal at the level Y dB is also narrowband noise with a bandwidth smaller or not larger than the desired signal, centered in the same frequency area, and played at the same time, the desired signal may render the undesired sound signal imperceptible even if Y=X−6 dB (i.e., when the undesired signal is only 6 dB below the desired signal).

This observation allows for high quality audio coding at high compression ratios, where such high compression fundamentally introduces large amounts of quantization noise (i.e., noise which is masked if introduced appropriately). The exact relationship (or level difference for masking) does, however, depend on correlation between the two signals as well as the frequency range of interest. Nevertheless, this principle holds for sufficiently narrow uncorrelated sources.

In contrast, if the desired signal is quite stationary and very narrow, such as a tone, and the undesired signal is narrowband noise centered at the frequency of this tone, the undesired signal may need to be less than X−20 dB for the undesired signal to be rendered imperceptible (i.e., Y<X−20 dB). Again, the 20 dB number may change depending on a number of factors.

Nonetheless, this example illustrates a 14+ decibel difference in the required relative values of X and Y in two scenarios: one where an undesired signal (such as residual echo) is imperceptible if Y<X−6 and thus muting the uplink by an echo gate is not necessary, and one where the undesired signal (residual echo) would be perceptible if X−20<Y and muting would improve the clarity of communications. Accordingly, based on the above scenarios, there is a range of at least X−20<Y<X−6 where the echo may or may not be perceptible depending on the perceptual interaction and properties of the two signals and where RMS levels provide little information regarding application of an echo gate.

Supra-Threshold Loudness

Even when the residual echo is perceptible (i.e., above the masking threshold) the loudness of this residual echo is affected by the presence of the desired signal. The effect may be dependent on principles/factors such as the one described above. In fact, the loudness of an isolated signal may depend on where the signal is in frequency and properties such as the signal's bandwidth.

The growth of perceived loudness is also non-linear with the energy level (mean square level) (e.g., growing under different power-laws that can range from ½ to ⅓ to ¼ to near zero depending on the absolute sound pressure level (SPL) even for a given (fixed) frequency) and with offsets that are highly frequency dependent. Nonetheless, supra-threshold measures may be effectively and implicitly included in noise-shaping principles.

Two equations are provided below that provide an example of a supra-threshold measure, which may be used for controlling the perceptual echo gate 211. These are taken from literature well known to those familiar with the state of the art on audio and speech coding.

Loudness of signal $Q$ in the presence of signal $E =$  Equation 1

$$L_N = \int_{x=xlow}^{x=xhigh} \left\{ \frac{\max(Q(x) - \max[M(x), \theta(x)], 0)}{\left(1 + \left(\frac{E(x)}{Q(x)}\right)^{p1}\right)} \right\}^{p2} dx$$

Here the integrand "x" would be in a suitable frequency scale such as a "bark" scale. Alternatively, one could integrate in a linear frequency domain "f" such as Hertz where the measure in the integral "dx" would be modified accordingly as a function of the frequency by dx/df. In Equation 1, Q is a frequency domain power representation of the main signal, which also is being played in the presence of the target signal, and M is a frequency domain power representation of the masking threshold, which depends on the main signal. The value $\theta$ is an assumed power level for the absolute minimum level of hearing as a function of frequency. All these variables Q, E, M, and $\theta$ are functions of a frequency variable "x". Values p1 and p2 and power laws may be selected based on perceptual principles and experimentation. Typically, p1=2 and p2=0.25. The values xlow and xhigh bound the frequencies over which the analysis is done. This bound may depend on the bandwidth of the signals of interest or information about primary areas of interest concerning residual echo problems.

Adapting Equation 1, Q may be the power spectrum of the spread residual echo, M may be the masking level as determined by the near-end sources, and E may be the spread near-end signal power spectrum. As used herein "spread" indicates that the power spectrums used are appropriately convolved with a frequency dependent spreading function.

In Equation 1, the integrand x is in an appropriate perceptual domain, such as a bark-like scale, and not necessarily a linear frequency. Accordingly, each of the values, Q, M, and E are functions of x. Use of a linear frequency scale may be used with appropriate weighting in the integral, as in any classic change of an integrand in mathematics as noted above. The weighting may also be changed to focus on certain frequency bands or to weigh some bands differently than others. Weighting may also be included into spreading.

Modeling the Supra-Threshold Loudness of Residual Echo

Equation 1 may also be adapted in various ways. For example, if computation is a concern and an accurate value for the loudness $L_N$ is not needed/necessary, but rather some indication that echo is very perceptible when there are extreme values for $L_N$, an integral may not be necessary, but rather a maximum over x may be computed instead. Since $L_N$ is an average (or sum) of loudness and there may be a greater concern regarding whether or not any echo at any frequency is perceptible, an accurate value for $L_N$ may not be needed and in these cases a maximum over x may be computed instead.

The power-law may also be modified from p2=0.25 to 1.0 in order to implicitly increase the consideration of regions where loudness is higher. This modification may also assist to reduce complexity by avoiding sqrt( ) and pow(z,0.25) operations. In one embodiment, this option may be used given that some focus on the extreme is the goal in the perceptual echo gate 211. The transition between the case $Q(x) \le M(x)$ and $Q(x) > M(x)$ may be softened by some function of $Q(x) - M(x)$, which softens the transition or which ramps up the denominator factor (E(x)/Q(x)).

Using Equation 1 to Assess the Near-End Loudness and Simplifications

In one embodiment, the roles of residual echo and of near-end may be flipped in Equation 1 with computing masking thresholds and modeling the loudness of the near-end in the presence of residual echo. However, a measure of how loud the near-end is may not be a concern if the residual echo is in fact sufficiently loud to be considered a masker. In such a case, which would only be appropriate if the residual echo level was high compared to near-end, the residual echo would be perceptible and the gate 211 should close.

Taking the simplified RMS model as an illustration, if it is known that the residual echo energy level Y is far greater than the near-end energy level X (e.g., Y>X+30 dB), there may be large confidence that no amount of masking by the near-end can render the residual echo imperceptible. Here, the gate 211 should close and a perceptual analysis is not needed (and certainly not an analysis that would flip the roles of near-end and echo in terms of masker and maskee).

Similarly, if it is known that the echo-level level Y is much less than that of the near-end level X (e.g., Y<X−50 dB), there may be a high confidence that even without a perceptual analysis, the residual echo is not perceptible since most likely Q(x)<M(x) for all x. In such a case, the gate 211 may not need to be closed and/or a perceptual analysis may not need to be performed.

In one embodiment, the appropriate use of both masking and supra-threshold measures may be for intermediate cases where the near-end can possibly mask residual echo and it is known M is close to that of Q. This is the case when Q refers to the residual echo and E refers to the near-end sources.

Need for Normalized Residual-Echo Loudness Measurer

The loudness of the residual echo in the presence of near-end sound as calculated by Equation 1 is an absolute level. The loudness of residual echo may have little meaning on its own. The actual perceived level depends on the playback volume and playback device and scenario. Therefore, some normalization may be needed.

Thus, a computation may be made based on a variation of Equation 1 and normalized by the loudness of the near-end estimate. This would give a relative loudness that now has more meaning.

The loudness of the near-end estimate could be calculated by flipping the roles of echo and near-end in Equation 1, but as noted above, this may only be done when the echo level is such that it cannot hope to mask the near-end sound. In such a case, and using a power law of one, and assuming little or no effect by the echo on the near-end, Equation 1 reverts to a simple sum energy measure. That is, using Q to denote the near-end signal and assuming M is approximately zero and the residual echo E is much less than Q, the loudness of the near-end looks like:

$$\text{Loudness of signal } Q, \text{ now the near-end, in the presence of signal } E, \text{ now residual echo} = L_{nearEnd} = \int_{x=low}^{x=high} Q(x)^{p2} dx = Q(x) dx \text{ if } p2=1.0 \quad \text{Equation 2}$$

Example Embodiment of the Perceptual Echo Gate 211

Referring back to FIG. 2, the perceptual echo gate 211 is located after the EC 205 and often after the RES 207 and the NS 209. Information from this initial uplink processing that is passed to the perceptual echo gate 211 may include: 1) the primary signal (i.e., the original signal form the microphone 105A, which has been passed through the EC 205, the RES 207, and/or the NS 209); 2) other signals, such as linear echo estimates from the EC 205 and/or residual echo estimates from the RES 207 (alternatively, the perceptual echo gate 211 may be given information from the EC 205 and/or the RES 207 to formulate its own residual echo estimate(s)); 3) suppression factors that were applied by the RES 207 and/or the NS 209 as a function of frequency; and 4) other metrics such as indications of double-talk (i.e., simultaneous uplink and downlink signals), the EC 205 convergence state, the speed of changes in EC 205 states, etc.

Figure 3:
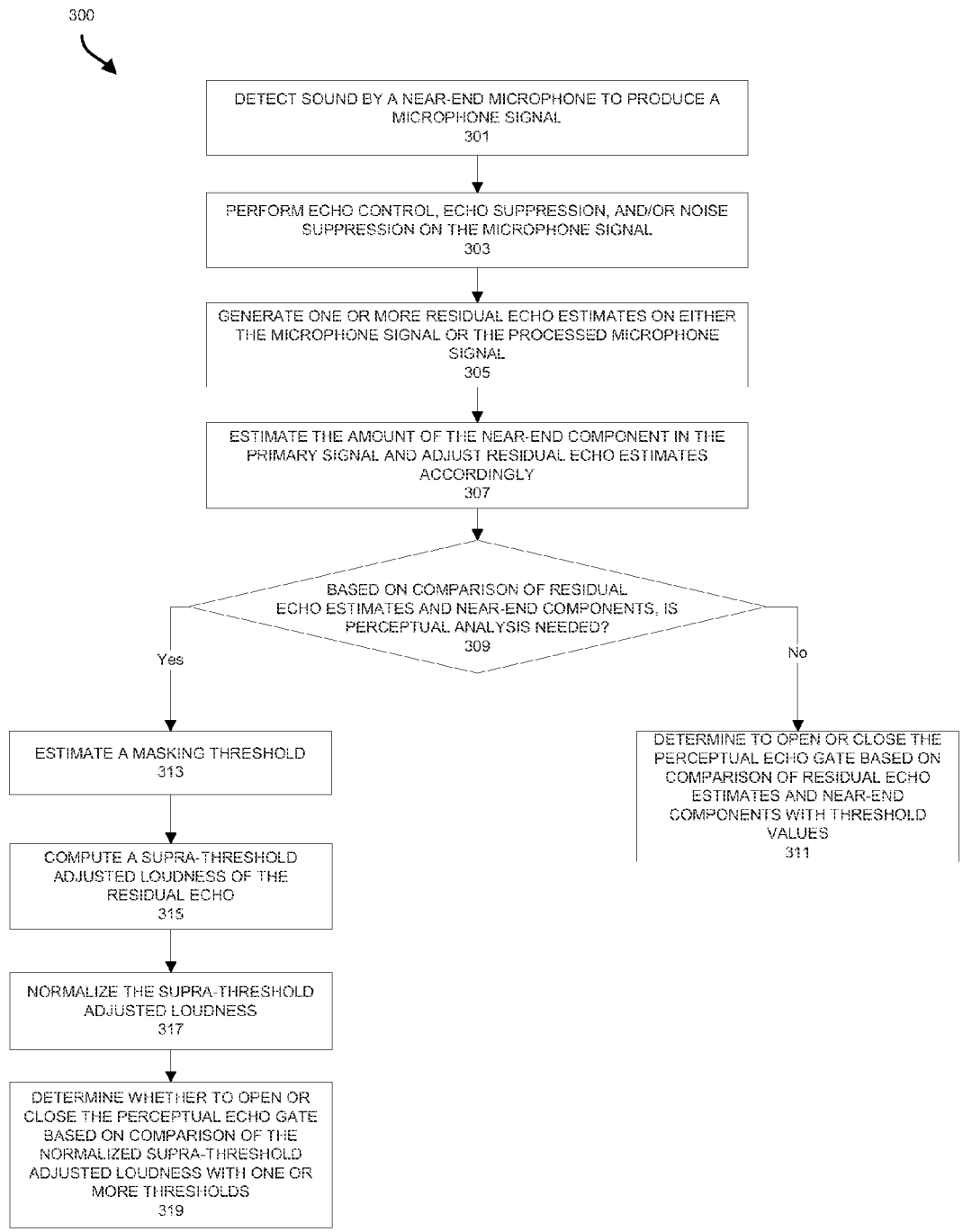
FIG. 3 shows a method for controlling a perceptual echo gate according to one embodiment.

FIG. 3 shows a method 300 for controlling the perceptual echo gate 211 according to one embodiment. Each operation of the method 300 may be performed by one or more components of the near-end system 101. Although the operations of the method 300 are shown in a particular order, in some embodiments, the order and/or timing of operations may be different than shown. For example, in some embodiments, one or more operations may be performed during overlapping time periods.

The method 300 may commence at operation 301 with the detection of sound by the microphone 105A at the near-end 115A to produce a microphone signal. In one embodiment, the sound detected at operation 301 and represented by the microphone signal may include sound produced by the near-end user 117A, sound produced by the loudspeaker 113A corresponding to sound detected at the far-end 115B and transmitted to the near-end 115A, and/or noise at the near-end 115A (e.g., sounds from a fan).

In one embodiment, the microphone signal generated at operation 301 may be processed at operation 303 by the EC 205, the RES 207, and/or the NS 209 to control/suppress echo and/or noise in the signal. Processing at operation 303 may be performed based on a reference signal received from the far-end system 103.

Following the detection of sound at operation 301 and processing at operation 303, at operation 305 an estimation unit may make one or more residual echo estimates on the primary signal produced at operation 303. The residual echo estimates may be made by the EC 205 and/or the RES 207 (i.e., the estimation unit may be the EC 205 or the RES 207, or some combination). If these estimates are based on outputs of the EC 205 or are based on an initial estimate by the RES 207 including pre-suppression by the RES 207, these residual echo estimates are appropriately adjusted, as needed, given information about the suppression factors that the RES 207 and/or the NS 209 introduced into the primary signal. The primary signal represents the echo suppressed signal (i.e., echo suppression performed by the RES 207 and/or the NS 209). If the perceptual echo gate 211 estimates residual echo itself (i.e., the estimation unit may be the echo gate 211), the gate 211 may start by using the un-suppressed primary signal (i.e., a signal that is post-EC 205, but pre-RES 207 and/or pre-NS 209) to gain information on the pre-RES 207 and/or pre-NS 209 residual echo. This pre-RES 207 and/or pre-NS 209 residual echo may thereafter be adjusted by the RES 207 and/or the NS 209 suppression gains to estimate the post-RES 207 and/or post-NS 209 residual echo.

In one embodiment, a number of biased residual estimates may also be calculated at operation 305. For example, a residual echo estimate may be calculated that is biased lower and a residual echo estimate may be calculated which is biased higher.

At operation 307, an estimate is made of the near-end component (i.e., the desired sound) that is in the primary signal (i.e., the RES 207 and/or the NS 209 suppressed primary signal). In one embodiment, an estimate is made by subtracting the residual echo estimate from the primary signal. This subtraction may happen in either the frequency domain or the power spectrum domain.

In some embodiments, a biased residual echo estimate (e.g., biased lower) may be used for the near-end calculation. Biases may be implemented by tracking high and low values of scale factors used to scale raw echo power-spectrums to calculate power spectrums of residual echo elements. Various constraints may also be considered when making this estimate at operation 307 (e.g., that the power spectrum of the near-end components is bounded from below by zero). Such constraints may also lead to re-evaluation of the residual echo estimate(s) performed at operation 305. In particular, the sum of the power spectrums of the estimated near-end and estimated residual echo may be bounded by the power spectrum of the primary input to the gate 211.

At operation 309, an initial assessment of the relative energy levels of near-end sources and residual echo (both post-EC 205, RES 207, and/or NS 209) is made based on comparisons with predefined thresholds. As mentioned above, if such a relative level falls into intermediate ranges where it is not clear if residual echo is perceptible or not, then a perceptual analysis is likely needed. This perceptual analysis will provide a better indication than simple energy measures in determining whether or not the residual echo in the suppressed signal is perceptible and whether echo gating using the echo gate 211 is necessary. Outside of such an intermediate range, the perceptual echo gate 211 opens or closes appropriately at operation 311 based on direct comparisons of the relative energy levels of near-end sources and residual echo with threshold values.

If operation 309 determines that perceptual assessment is needed, then operations 313, 315, and 317 may perform this perceptual analysis to determine operation of the echo gate 211 (i.e., control opening and closing the echo-gate 211). In one embodiment, the perceptual analysis may begin at operation 313 with computation of a masking threshold based on an analysis of present and past estimates of near-end power spectrums. As noted above, these are post-RES 207 and/or post-NS 209 estimates of near-end power spectrums, since the masking properties of this suppressed signal are sought.

Computation of a masking threshold may include appropriate spreading by cochlear filters, a "tonality" measure which determines the stationarity of the masker as a function of frequency, and a mapping from tonality to a masking threshold offset. In practice, various simplifications to this process may be used to reduce computational load (e.g., simplification of parameterizations of spreading functions is one technique that may be used).

In one embodiment, all filters used to generate the masking threshold may be a function of a single filter h. For low frequencies, h may be appropriate by itself. For higher frequencies, the effective h may be h*h where "*" denotes convolution. For even higher frequencies, the effective h may be h*h*h. Thus, by running convolutions again in selected bands, spreading may be obtained without using long, unparameterized filters.

For simplicity, the residual echo may be assumed to be noise-like in determining the above masking threshold offsets. In one embodiment, tonality estimates may be generated on the residual echo itself.

The power spectrum, spread appropriately, of the current residual echo is calculated. In one embodiment, a bias may be used in such an estimate (e.g., an estimate biased higher).

At operation 315, a supra-threshold loudness metric may be computed. In one embodiment, the supra-threshold loudness metric may be computed using an equation similar to Equation 1. In this embodiment, adjustments may be made to Equation 1 as described above.

The loudness computed at operation 315 is that of the residual echo given the presence of near-end sound. As mentioned, the loudness is an absolute level that may have somewhat little meaning on its own. An energy measure for the near-end loudness may be used, which is appropriate for the intermediate situations where the perceptual modeling is done. This sum-energy may be used to normalize the perceptual-based loudness of the residual echo at operation 317.

In one embodiment, the normalized loudness measure computed at operation 317 may be used to drive open and close decisions for the perceptual echo gate 211 at operation 319, with appropriate hysteresis and thresholds similar to those used in a non-perceptual echo gate. In one embodiment, the decisions may include toggling the gate 211 between un-mute, partial mute, and full mute states. Testing has shown that this new relative-loudness measure can easily be ten or more dB different than a simple relative-energy measure such as X-Y or W-R (mentioned previously), which is used by traditional echo gates. Accordingly, the perceptual echo gate 211 may behave very differently in the intermediate cases where the level of near-end and echo are such that perceptual analysis is needed. These cases have been shown to be critical to voice quality, (e.g., they can include cases of devices used in cars, on the street, etc.), where the very random nature of the background noise, as a near-end source, can mask residual echo. It also provides less gating of speech onsets and offsets. As a result, the perceptual echo gate 211 and the method 300 for using the echo gate 211 provides improved communication quality in comparison to traditional echo gates by, for example, reducing dropouts 1) during periods such as double-talk or 2) during periods of downlink playback in the presence of low near-end signal levels, two cases of particular importance.

As explained above, an embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method for controlling an echo gate in a communications system, comprising:
   detecting sound at a near-end location by a set of microphones to produce a primary signal, wherein the sound includes one or more of 1) desired sounds to be transmitted to a far-end location, 2) echo introduced by a loudspeaker playing sound received from the far-end location, and 3) noise introduced at the near-end location;
   processing the primary signal to reduce the echo;
   estimating an amount of residual echo in the processed primary signal;
   estimating an amount of the desired sounds in the processed primary signal;
   performing a perceptual analysis on the processed primary signal using the estimations of the amount of residual echo and the amount of the desired sounds, to determine masking properties of residual echo in the processed primary signal in relation to the desired sounds in the processed primary signal; and
   toggling an echo gate between open and closed states based on the perceptual analysis.

2. The method of claim 1, wherein toggling the echo gate is performed between un-mute, partial mute and full mute states.

3. The method of claim 1
   wherein processing the primary signal to reduce the echo comprises using one or more of linear echo cancellers, a non-linear residual echo suppressor, and a noise suppressor.

4. The method of claim 3, further comprising:
   adjusting the estimation of the amount of residual echo based on suppression factors introduced by the non-linear residual echo suppressor and the noise suppressor.

5. The method of claim 1, wherein estimating the amount of the desired sounds in the processed primary signal comprises:
   subtracting the estimation of the amount of residual echo from the processed primary signal.

6. The method of claim 5, further comprising:
biasing the estimation of the amount of residual echo prior to subtracting from the processed primary signal.

7. The method of claim 1, further comprising:
comparing the estimation of the amount of residual echo and the estimation of the amount of desired sounds against a set of thresholds, wherein the perceptual analysis is performed in response to the estimation of the amount of residual echo and the estimation of the amount of desired sounds falling within an intermediate region between the set of thresholds.

8. The method of claim 1, further comprising:
toggling the echo gate open upon determining by the perceptual analysis that that the residual echo fails to mask the desired sounds by a predefined level.

9. The method of claim 1, wherein performing the perceptual analysis comprises:
estimating a masking threshold based on signals representing past and present desired sounds in the processed primary signal, by spreading power of said signals over frequency by cochlear filters, calculating a tonality measure that determines stationarity of a masker as a function of frequency, and mapping from tonality to a masking threshold offset;
computing a supra-threshold loudness metric based on the masking threshold; and
comparing the supra-threshold loudness metric with a set of thresholds to determine whether the residual echo masks the desired sounds by a predefined level.

10. The method of claim 9, further comprising:
normalizing the supra-threshold loudness metric based on the estimation of the amount of the desired sounds in the processed primary signal.

11. A system for controlling an echo gate in a communications system, comprising:
a set of microphones to detect sound at a near-end location to produce a primary signal, wherein the sound includes one or more of 1) desired sounds to be transmitted to a far-end location, 2) echo introduced by a loudspeaker playing sound received from the far-end location, and 3) noise introduced at the near-end location;
an echo canceller to process the primary signal to reduce the echo;
an estimation unit to estimate an amount of residual echo in the processed primary signal and estimate an amount of the desired sounds in the primary signal;
an echo gate to 1) determine masking properties of residual echo in the processed primary signal in relation to the desired sounds in the processed primary signal and 2) toggle uplink transmission between mute and un-mute states based on the masking properties.

12. The system of claim 11, wherein the echo canceller comprises:
one or more of linear echo cancellers, a non-linear residual echo suppressor, and a noise suppressor.

13. The system of claim 12, wherein the estimation unit further adjusts the estimate of the amount of residual echo based on suppression factors introduced by the non-linear residual echo suppressor and the noise suppressor.

14. The system of claim 11, wherein the echo gate compares the estimation of the amount of residual echo and the estimation of the amount of desired sounds against a set of thresholds, wherein the masking properties are determined in response to the estimation of the amount of residual echo and the estimation of the amount of desired sounds falling within an intermediate region between the set of thresholds.

15. The method of claim 11, wherein the echo gate is opened upon determining that that the residual echo fails to mask the desired sounds by a predefined level.

16. The system of claim 11, wherein the echo gate is to further:
estimate a masking threshold based on signals representing past and present desired sounds in the processed primary signal, by spreading power of such signals over frequency by cochlear filters, calculating a tonality measure that determines stationarity of a masker as a function of frequency, and a mapping from tonality to a masking threshold offset;
compute a supra-threshold loudness metric based on the masking threshold; and
compare the supra-threshold loudness metric with a set of thresholds to determine whether the residual echo masks the desired sounds by a predefined level.

17. An article of manufacture for controlling an echo gate in a communications system, comprising:
a non-transitory machine-readable storage medium that stores instructions which, when executed by a processor in a computing device,
detect sound at a near-end location by a set of microphones to produce a primary signal, wherein the sound includes one or more of 1) desired sounds to be transmitted to a far-end location, 2) echo introduced by a loudspeaker playing sound received from the far-end location, and 3) noise introduced at the near-end location;
process the primary signal to reduce the echo;
estimate an amount of residual echo in the processed primary signal;
estimate an amount of the desired sounds in the processed primary signal;
perform a perceptual analysis on the processed primary signal using the estimations of the amounts of residual echo and the desired sounds, to determine masking properties of residual echo in the processed primary signal in relation to the desired sounds in the processed primary signal; and
toggle uplink transmission between mute and un-mute states based on the masking properties that is determined by the perceptual analysis.

18. The article of manufacture of claim 17, wherein the non-transitory machine-readable storage medium stores further instructions which when executed by the processor:
process the primary signal to reduce the echo using one or more of linear echo cancellers, a non-linear residual echo suppressor, and a noise suppressor.

19. The article of manufacture of claim 18, wherein the non-transitory machine-readable storage medium stores further instructions which when executed by the processor:
adjust the estimation of the amount of residual echo based on suppression factors introduced by the non-linear residual echo suppressor and the noise suppressor.

20. The article of manufacture of claim 17, wherein the non-transitory machine-readable storage medium stores further instructions for estimating the amount of the desired sounds in the processed primary signal which when executed by the processor:
subtract the estimation of the amount of residual echo from the processed primary signal.

21. The article of manufacture of claim 20, wherein the non-transitory machine-readable storage medium stores further instructions which when executed by the processor:
bias the estimation of the amount of residual echo prior to subtracting from the processed primary signal.

22. The article of manufacture of claim 17, wherein the non-transitory machine-readable storage medium stores further instructions which when executed by the processor:
compare the estimation of the amount of residual echo and the estimation of the amount of desired sounds against a set of thresholds, wherein the perceptual analysis is performed in response to the estimation of the amount of residual echo and the estimation of the amount of desired sounds falling within an intermediate region between the set of thresholds.

23. The article of manufacture of claim 17, wherein the non-transitory machine-readable storage medium stores further instructions which when executed by the processor:
toggle the uplink transmission to an un-mute or partial mute, not full mute, state upon determining by the perceptual analysis that that the residual echo fails to mask the desired sounds by a predefined level.

24. The article of manufacture of claim 17, wherein the non-transitory machine-readable storage medium stores further instructions for performing the perceptual analysis which when executed by the processor:
estimate a masking threshold based on signals representing past and present desired sounds in the processed primary signal, by spreading power of such signals over frequency by cochlear filters, calculating a tonality measure that determines stationarity of a masker as a function of frequency, and a mapping from tonality to a masking threshold offset;
compute a supra-threshold loudness metric based on the masking threshold; and
comparing the supra-threshold loudness metric with a set of thresholds to determine whether the residual echo masks the desired sounds by a predefined level.

25. The article of manufacture of claim 24, wherein the non-transitory machine-readable storage medium stores further instructions which when executed by the processor:
normalize the supra-threshold loudness metric based on the estimation of the amount of the desired sounds in the processed primary signal.

* * * * *